(12) United States Patent
Mock et al.

(10) Patent No.: US 10,981,369 B2
(45) Date of Patent: Apr. 20, 2021

(54) METHOD AND INSTALLATION FOR JOINING A COVER LAYER TO AN OBJECT, AS WELL AS COVER LAYER SUITABLE FOR THE METHOD

(71) Applicant: Woodwelding AG, Stansstad (CH)

(72) Inventors: Elmar Mock, Biel/Bienne (CH); Mario Lehmann, Les Pommerats (CH); Laurent Torriani, Lamboing (CH); Jörg Mayer, Niederlenz (CH)

(73) Assignee: WOODWELDING AG, Stansstad (CH)

( * ) Notice: Subject to any disclaimer, the term of this patent is extended or adjusted under 35 U.S.C. 154(b) by 203 days.

(21) Appl. No.: 16/382,894

(22) Filed: Apr. 12, 2019

(65) Prior Publication Data

US 2019/0315110 A1   Oct. 17, 2019

(30) Foreign Application Priority Data

Apr. 17, 2018   (CH) .................................... 00 498/18

(51) Int. Cl.
*B32B 37/22*   (2006.01)
*B32B 37/10*   (2006.01)
(Continued)

(52) U.S. Cl.
CPC .......... *B32B 37/1045* (2013.01); *B32B 37/04* (2013.01); *B32B 37/06* (2013.01);
(Continued)

(58) Field of Classification Search
CPC ..... B32B 37/1045; B32B 37/04; B32B 37/06; B32B 37/0053; B32B 2305/188; B32B 2305/345; B32B 2309/02
See application file for complete search history.

(56) References Cited

U.S. PATENT DOCUMENTS 3,528,867 A * 9/1970 Leatherman et al. .. B29C 65/00
156/272.4
2003/0188819 A1* 10/2003 Campbell ............. B29C 65/087
156/73.1
(Continued)

FOREIGN PATENT DOCUMENTS

CN  107848216   3/2018
EP  1 154 892    5/2005
(Continued)

OTHER PUBLICATIONS

Extended European Search Report dated Jul. 22, 2019, Application No. EP 19 16 9702, 13 pages.

*Primary Examiner* — Jeffry H Aftergut
(74) *Attorney, Agent, or Firm* — Rankin, Hill & Clark LLP

(57) ABSTRACT

A method and installation for joining a cover layer to an object in a continuous process. Joining is effected with the aid of a joining material having thermoplastic properties, wherein the joining material is arranged between the cover layer and the object and is liquefied using ultrasonic vibration energy. Before application of the ultrasonic vibration energy, the joining material is preheated in a contactless manner with the aid of electromagnetic induction in the region of the glass transition temperature of the joining material or above this glass transition temperature. The object is in particular a chip board and the cover layer an edge strip to be joined to an edge of the chip board.

32 Claims, 9 Drawing Sheets

(51) Int. Cl.
  *B32B 37/04* (2006.01)
  *B32B 37/06* (2006.01)
  *B32B 37/00* (2006.01)

(52) U.S. Cl.
  CPC ..... *B32B 37/0053* (2013.01); *B32B 2305/188* (2013.01); *B32B 2305/345* (2013.01); *B32B 2309/02* (2013.01)

(56) References Cited

U.S. PATENT DOCUMENTS

2013/0139956 A1  6/2013  Aeschlimann et al.
2014/0057067 A1  2/2014  Torriani et al.

FOREIGN PATENT DOCUMENTS

| EP | 2 796 272 | 10/2014 |
| EP | 2 977 186 | 1/2016 |
| EP | 3 031 588 | 6/2016 |
| WO | 01/89809 | 11/2001 |
| WO | 2009/156754 | 12/2009 |
| WO | 2016/071335 | 5/2016 |

* cited by examiner

METHOD AND INSTALLATION FOR JOINING A COVER LAYER TO AN OBJECT, AS WELL AS COVER LAYER SUITABLE FOR THE METHOD

BACKGROUND OF THE INVENTION

Field of the Invention

The invention concerns a method and an installation for joining a cover layer to an object, wherein the cover layer or the object includes a joining material, which, for the joining process, is liquefied or at least plasticized with the aid of mechanical vibration energy. Therein, the joint produced with the aid of the method is preferably a positive fit connection but may also be a weld or an adhesive connection. The joining process of the method is a continuous process for which the object is conveyed through the installation and the cover layer is fed into the installation in a continuous manner. The invention further concerns a cover layer as well as a pair of cover layer and object that are suitable to be processed with the aid of the method and the installation.

A main application of the method and installation according to the invention is the joining of edge strips including the joining material to edges of flat objects (in particular boards) including a porous or fibrous material, such as e.g. wood or chipboard. However, the method and installation according to the invention are applicable also for joining edge strips to edges of flat objects, wherein the flat object includes the joining material. Another application of the method and installation according to the invention is the preparation of a sandwich-structured composite, wherein either the core or the skins (top layers) are porous. A sandwich-structured composite as used herein refers to a composite material which is composed of different layers being made of materials with different features, having the sequence top layer—core-top layer (e.g. a low-density core, and a thin skin-layer bonded to each side). Suitable core materials are e.g. open- and closed-cell-structured foams and honeycomb structured materials. Sometimes, the honeycomb structure is filled with other foams for added strength. Open- and closed-cell metal foam can also be used as core materials. Metal composite material is a type of sandwich formed from two thin skins of metal bonded to a plastic core which may be produced using a method and installation according to the invention. Also laminates of glass or carbon fiber-reinforced thermoplastics can be produced using a method and installation according to the invention. A porous material as used herein is each material having empty spaces or voids. Furthermore, method and installation according to the invention are also suitable for other applications, in which, in particular, the cover layer is not strip-shaped and/or the cover layer is attached not to the edge of a board-shaped object, but to any surface of an object of any shape, wherein either one of the cover layer and the object includes the joining material.

A continuous process for joining an edge strip to boards is, e.g., described in the publication WO 01/89809. According to the disclosure of the named publication, the boards are made e.g. of wood or chipboard and the edge strip is made of a thermoplastic material. The boards are conveyed behind each other through an apparatus and the edge strip is fed into the apparatus from a feed roll. During conveyance, the edge strip is pressed against the edge of the board and ultrasonic vibration is applied to the edge strip through a vibrating sonotrode acting from the strip side facing away from the board. The vibration causes friction between the strip and the board and therewith heat, which causes the strip material to be liquefied, and, due to the pressure, this liquefied material is pressed into the board material, where, on re-solidification it constitutes together with the board material a sort of a composite material and therewith a positive fit connection between the edge strip and the board.

According to the disclosure of WO 01/89809, use of ultrasonic vibration in the joining process has the advantage that the liquefied material has a very low viscosity due to the high shearing rates produced by the vibration. This low viscosity enables the liquefied material to penetrate into and to be dislocated in very fine e.g. porous or fibrous structures without the need of high forces and without high mechanical loading of these structures. This effect is further enhanced through the fact that the heating by vibration occurs in particular where the material to be liquefied is in contact with the porous or fibrous structure, such that the molten material will not have a cooler skin of a higher viscosity where in contact with the porous or fibrous structure even if the latter has a lower temperature.

A further method for establishing a positive fit connection between two objects of which one includes a thermoplastic material that is liquefied or at least plasticized with the aid of ultrasonic vibration energy is disclosed in the publication WO 2016/071335. According to this method, the vibration energy is applied to the one of the two objects, which does not include thermoplastic material, and which has, e.g., the shape of a stud including an undercut structure. The vibrating object is pressed against and into the thermoplastic material of the other object. Due to the vibration, the thermoplastic material is liquefied or at least plasticized and at least a distal portion of the vibrating object is pressed into the thermoplastic material, which, on re-solidification, surrounds at least the named distal end tightly, constituting in cooperation with an undercut structure a positive fit connection between the two objects.

A further continuous process for joining an edge strip to flat objects is disclosed in the publication EP2977186, wherein the flat objects are fiber reinforced composite boards including a thermoplastic or thermoset polymer. The edge strip consists of a thermoplastic polymer. In the continuous process for joining the edge strip to the edge of the board, the edge strip is pressed against the edge of the board and the thermoplastic polymer of the edge strip is partly liquefied using ultrasonic vibration applied to the edge strip for welding or adhesively joining the edge strip to the edge of the board.

Both named publications WO 01/89809 and EP2977186 propose for the continuous joining process stationary sonotrodes acting on the edge strip and they are silent regarding output of corresponding installations. The publication EP2977186 also proposes a rotating sonotrode, i.e. most probably a roll-shaped sonotrode arranged with a rotating axis parallel to the edge strip width and an axial length which corresponds about with the edge strip width. Similar rotating sonotrodes are widely used in continuous ultrasonic welding processes.

EP1154892 refers to an ultrasonic welding apparatus for welding together at least two superposed sheets made of plastics material and travelling continuously along a determined path. EP1154892 also provides a method of closing flexible packages by welding. One optional characteristic of the method comprises, prior to closing each package by ultrasonic welding, to heat each flank of each package so as to soften the inside faces of the flanks of each package. The heating can be performed by conduction or by injecting steam.

WO 209/156754 describes a method of production of a fiber reinforced thermoplastic composite structure including locally heating of at least the upper layer of the composite structure prior to introducing ultrasonic energy waves to the heated portion and consolidation.

The disclosure of all the above cited publications is enclosed herein by reference.

Experiments show that for establishing, with the aid of a thermoplastic joining material being liquefied or at least plasticized by application of ultrasonic vibration energy, a positive fit connection between two objects, application of the ultrasonic vibration energy needs to be longer than for an ultrasonic welding process. This is valid for the case of the liquefied material penetrating into a penetrable material as well as for the case of embedding an element in the liquefied or at least plasticized material. The need of the longer application time is in particular due to the fact, that more material needs to be liquefied or plasticized and that the liquefied material also needs to be dislocated. Usually, an application time of a few seconds is needed, e.g., in the range of 3 to 5 sec. This means that for establishing the proposed joint in a continuous process and using a stationary sonotrode of an extension in conveying direction of say 250 mm would allow a conveying speed of at the most 5 m/min, or even considerably less when using a rotating sonotrode. This can of course be improved by using a series of stationary or rotating sonotrodes, which however may result in undesired markings on the outer surface of the edge strip, or in undesired effects due to cooling during conveyance between successive sonotrodes, in particular between rotating sonotrodes which cannot be arranged immediately behind each other.

SUMMARY OF THE INVENTION

The present invention is directed toward a method and an installation for joining a cover layer to an object in a continuous process, wherein the cover layer or the object includes a thermoplastic joining material, which, for the joining process, is liquefied or at least plasticized with the aid of mechanical vibration energy, in particular with ultrasonic vibration energy, wherein the joint to be achieved with the method is in particular a positive fit connection, but may also be a weld or possibly an adhesive connection. Therein, the method and the installation are to improve corresponding methods and installations of the state of the art by allowing higher conveying speeds (desirable: up to 100 m/min) without rendering the installation relevantly more complex and without impairing a high product quality. The method and the installation are to be suitable in particular for joining an edge strip to edges of board-shaped objects but may also be applicable for other processes in which a cover layer is joined to the surface of an object.

The principle improvement of method and installation according to the invention consists of adding to the joining method of the state of the art a step of preheating the thermoplastic joining material using electromagnetic induction before and possibly also during the step of applying the vibration energy, and of adding to the installation a corresponding preheating device, which device is arranged immediately upstream of the device for applying the vibration energy (vibrating tool). Therein the preheating device is equipped for contactless and preferably locally restricted preheating by electric or magnetic induction.

The preheating is controlled for the thermoplastic joining material to reach at least a temperature in the region of its glass transition temperature, preferably above the glass transition temperature, but below the temperature range in which the material or its polymeric component respectively melts. This means that vibration energy is used mainly for liquefaction and only little for raising the temperature of the joining material, in particular, it is not used for heating the joining material at temperatures below its glass transition temperature where absorbance of the vibration energy is low and therefore such heating is particularly inefficient. This means furthermore, that the time necessary for the joining process is relevantly shorter than the time necessary for achieving the same aim with a method according to the state of the art not including the preheating step.

Furthermore, the preheating is preferably locally restricted to heat the joining material only, i.e. only the material which, for establishing the joint, needs to be liquefied or plasticized. This means that liquefaction of further portions of the cover layer and/or of the object are not or hardly preheated and therefore absorb considerably less of the vibration energy, even if such further portions include a material which has very similar thermoplastic properties as the joining material.

For enabling the contactless preheating using electromagnetic energy, the joining material or some other component of the cover layer and/or the object needs to be capable to function as a susceptor or an absorber (for magnetic or electric induction heating), wherein for the desired local restriction of the preheating this other component needs to be arranged in the immediate vicinity of the joining material. Preferably, the joining material includes a susceptor or absorber additive (e.g. particles, fibers, or two- or three-dimensional arrangements of fibers, threads or wires), wherein thermoplastic portions neighboring the joining material are exempt from the preheating by not including the susceptor or absorber additive. There exist thermoplastic polymers also, which themselves can function as susceptor or absorber and are therefore suitable as joining materials or component thereof. Alternatively, the susceptor or absorber function is taken over by a separate susceptor or absorber element (e.g. two- or three-dimensional arrangement of fibers, threads or wires) which is separately fed into the joining process, and is preferably separately preheated and brought into contact with the joining material in a preheated configuration.

An important feature of the induction heating process is that the heat is generated inside the joining material itself, instead of by an external heat source via heat conduction. Thus the joining material can be heated very rapidly and target-oriented, (the presence of the susceptor or absorber defines the location of heating). Once at least part of the thermoplastic material has been liquefied, a high-frequency magnetic field can also be used to stir the joining material, which is useful in ensuring that the thermoplastic material is fast and completely liquefied and that the joining material is mixed and dislocates (flows into pores or voids). Without prejudice the inventor imagine that this is a possible explanation for the observation that using electromagnetic induction within the method of the invention makes the joining process faster and more precisely compared to other heating techniques known.

Mechanical vibration or oscillation suitable for the method according to the invention has preferably a frequency between 2 and 200 kHz (even more preferably between 10 and 100 kHz, or between 20 and 40 kHz) and a vibration energy of 0.2 to 20 W per square millimeter of active surface. The vibrating tool is, e.g., a stationary sonotrode designed such that its contact face oscillates predominantly in the direction of the tool axis (longitudinal vibration) and with an amplitude of between 1 and 100 µm, preferably around 30 to 60 µm. The vibrating tool may also be a rotating sonotrode. The named preferred vibrations are, e.g., produced by stationary or rotating sonotrodes of ultrasonic devices as e.g. known from ultrasonic welding.

The method of heating polymeric materials by electromagnetic induction, i.e. with the aid of an alternating electromagnetic field and a susceptor additive is per se known. A comprehensive description of presently known applications and developments is contained, e.g. in the publication Thomas Bayerl et al, Compsites: Part A 57 (2014), pages 27-40, Elsevier.

The induction heating phenomenon appears when electrically conductive and/or magnetic, in particular ferromagnetic, materials are exposed to an electromagnetic field alternating with a frequency in the kilohertz to megahertz range. This alternating field causes eddy currents and/or magnetic polarization effects and therewith heating of the material through electric resistance and/or hysteresis loss. For heating a polymer not having the desired features, the polymer is to include a susceptor additive which is electrically conductive and/or magnetic. Therein the term "magnetic" is to be understood in a wide sense as being excitable by an alternating electromagnetic field in the named frequency range and therewith producing heat.

Commonly used susceptor materials are, e.g., metals such as ion, nickel, cobalt, or suitable metal alloys, or oxidic minerals such as magnetite, hematite, chromium(IV)oxide, goethite, or lepidocrite, or carbon. Commonly used susceptor additives are flat or three-dimensional structures, e.g., woven structures, or particles and fibers with sizes e.g. in the nano-range being dispersed, e.g. evenly, in the polymer. For electrically conducting and possibly ferromagnetic flat or three-dimensional susceptor structures the heating effect is mainly due to eddy currents whereas for susceptor additives in the form of particles or fibers which are dispersed in the polymer the heating effect is with decreasing additive concentration more and more due to hysteresis loss. For susceptors with magnetic or in particular ferromagnetic properties only, the latter is the only heating effect. As magnetic properties of a magnetic susceptor additive are lost when the composite material reaches the Curie temperature of the additive material, induction heating with the aid of a magnetic but non-conductive susceptor material is self-controlling (maximum reachable temperature of the composite material including the polymer and the additive is equal to the Currie temperature of the additive).

Thermoplastic joining materials being suitable for the method according to the invention are based on a thermoplastic polymer, which is solid at ambient temperatures, which includes C, P, S or Si based chain molecules, and which transforms from solid into liquid or flowable above a critical temperature range, for example by melting, and re-transforms into a solid material when again cooled below the critical temperature range, for example by crystallization, whereby the viscosity of the solid phase is several orders of magnitude (at least three orders of magnitude) higher than of the liquid phase. The thermoplastic polymer will generally include a polymeric component that is not cross-linked covalently or cross-linked in a manner that the cross-linking bonds open reversibly upon heating to or above a melting temperature range. In addition to the thermoplastic polymer, the material may include a filler, e.g., fibers or particles without thermoplastic properties or with thermoplastic properties including a melting temperature range that is considerably higher than the melting temperature range of the basic polymer, wherein the filler may take over the function of susceptor or absorber, possibly in addition to other functions.

Examples for the polymer base of thermoplastic joining materials applicable in the method according to the invention are thermoplastic polymers, co-polymers or filled polymers, including e.g. polyethylene, polypropylene, polyamides (in particular Polyamide 12, Polyamide 11, Polyamide 6, or Polyamide 66), Polyoxymethylene, polycarbonate urethane, polycarbonates or polyester carbonates, acrylonitrile butadiene styrene (ABS), Acrylester-Styrol-Acrylnitril (ASA), Styrene-acrylonitrile, polyvinyl chloride, polystyrene, or polyether ether ketone (PEEK), polyetherimide (PEI), Polysulfon (PSU), Poly(p-phenylene sulfide) (PPS), liquid crystal polymers (LCP) etc. LCPs are of particular interest since their sharp drop in viscosity during melting enables them to penetrate in very fine spaces in the penetrable material.

In all applications of the method according to the invention a contact surface of the cover layer and a contact surface of the object face each other in the joint to be established. At least part of this contact surface of one of the cover layer and the object includes the joining material constituting a first joining region. At least part of this contact surface of the other one of the cover layer and the object constitutes a second joining region whose position corresponds to the position of the first joining region and which is equipped for being able to be joined to the first joining region with the aid of the joining material being liquefied or at least plasticized.

In a first exemplary application of the method according to the invention, the second joining region includes a material that is penetrable by the joining material when in its liquefied or at least plasticized state. As stated already further above, an example for this first embodiment of the method according to the invention is a process in which an edge strip including a thermoplastic polymer material is joined to an edge of a board consisting of e.g. wood or chipboard.

Suitable penetrable materials are solid materials such as wood, plywood, chipboard, cardboard, concrete, brick material, porous glass, foams of metal, ceramic, or polymer materials, or sintered ceramic, glass or metal materials, wherein such materials include spaces into which the liquefied material can penetrate which spaces are originally filled with air or with another displaceable or compressible material. Further examples are composite materials that have the above stated properties or materials with surfaces including a suitable roughness, suitable machined surface structures or suitable surface coatings (e.g., consisting of particles). If the penetrable material has thermoplastic properties it is necessary, that it maintains its mechanical strength during the joining process either by further including a mechanically stable phase or by having a considerably higher melting temperature than the joining material.

The joining material and the penetrable material need to be adapted to each other such that a desired penetration is possible. A material pairing that has proved to be advantageous is, e.g., the pairing of chipboard (penetrable material) and a joining material including a polyamide.

In a second exemplary application of the method according to the invention the second joining region includes protrusions of a material that is not liquefiable under the process conditions, the protrusions preferably including an undercut structure. In the joining process, the protrusions of the second joining regions are embedded in the joining material of the first joining region such forming a positive fit connection between the cover layer and the object.

The non-liquefiable material of the protrusions may be a polymer based material, wherein the polymer base may be thermoset or thermoplastic. In the case of a thermoplastic polymer the protrusion material needs to have a melting temperature which is considerably higher than the melting temperature of the joining material (at least 50° C. higher), i.e., the thermoplastic polymer has at least one of a higher melting temperature, or a considerably higher viscosity at the melting temperature of the material to be liquefied and/or it is filled to a considerably higher degree. Furthermore, the protrusion material may also be a metal, a glass or a ceramic material.

In a third exemplary application of the method according to the invention, the joint to be achieved in the joining process is not a positive fit connection but a weld or an adhesive connection. For a weld connection, the second joining region includes a material based on a thermoplastic polymer which is liquefiable under the conditions of the joining process and which is wettable by the liquefied joining material. For an adhesive connection, the second joining region includes a material which is not liquefiable under the process conditions and is wettable by the liquefied joining material.

BRIEF DESCRIPTION OF THE DRAWINGS

The invention and exemplified embodiments of method and installation according to the invention are described in further detail in connection with the appended FIGS., wherein.

DESCRIPTION OF THE PREFERRED EMBODIMENTS

In all the following FIGS. same numerals designate same elements or elements having a same function.

Figure 1:
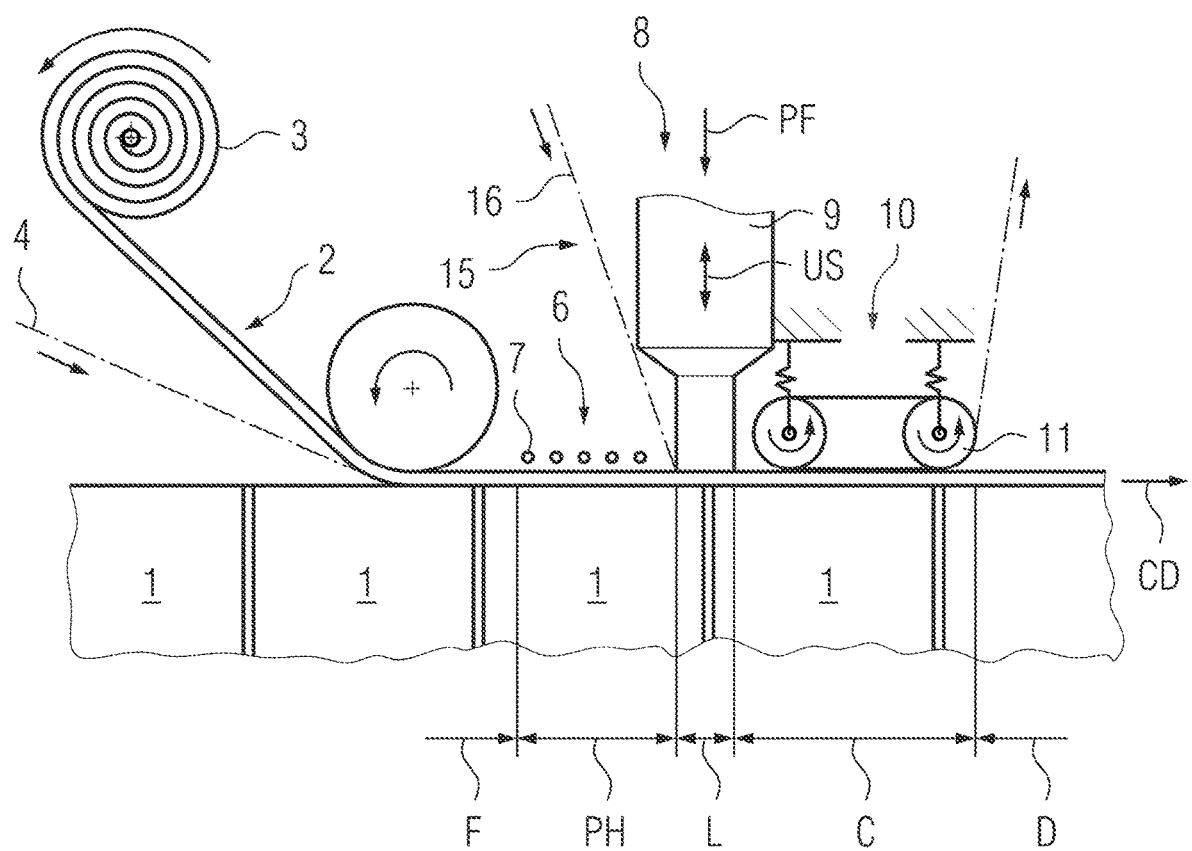
FIG. 1 is a very schematic illustration of an exemplary installation according to the invention.

FIG. 1 is a schematic illustration of an installation suitable for carrying out the continuous joining process according to the invention. The installation includes per se known conveying means (not shown) for conveying objects 1 in succession in a conveying direction CD from a feed zone F, through a preheating zone PH, a liquefaction zone L and a consolidation zone C, into a delivery zone D. The objects are illustrated as a plurality of similar, substantially rigid objects, e.g. boards, of which one surface oriented substantially parallel to the conveying direction, e.g. upper board edge, is to be covered with the cover layer 2, e.g., with an edge strip. As one skilled in the art will recognize, a single, in conveying direction quasi endless object, e.g. a flexible mat- or strip-like object, may be treated in a similar installation, wherein the conveying means need to be correspondingly adapted in particular if such single object is not rigid.

In the feed zone F, the cover layer 2 being, e.g., fed-in from a feed roller 3 is arranged relative to the objects 1 such that their contact faces face each other and, if applicable, such that joining regions of the objects 1 are arranged to face joining regions of the cover layer 2. In the case of a method using a separate susceptor or absorber element 4 (indicated in dash dotted lines), the latter is arranged between the cover layer 2 and the objects 1. FIG. 1 shows the objects 1 and the cover layer 2 and possibly the susceptor or absorber element 4 leaving the feed zone F not only arranged to face each other but being in contact with each other. In the case of preheating with the aid of hot air, the so called susceptor or absorber element 4 is used solely for transporting heat into the vicinity of the joining material.

Figure 4:
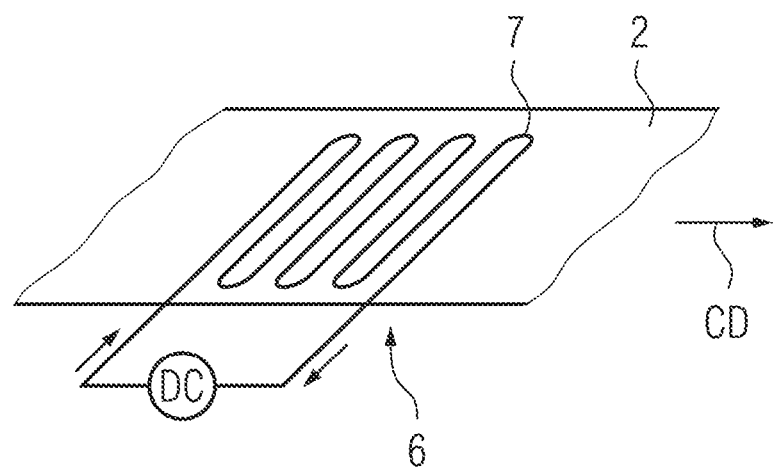
FIG. 4 shows an example of pre-heating devices suitable for installation and method according to the invention.

In the preheating zone PH, the joining material is preheated in a contactless electromagnetic heating process effected by a corresponding preheating device 6, by, e.g., passing through an alternating electromagnetic field created, e.g., by an arrangement of an electric conductor 7 extending back and forth, at a substantially constant distance from the outer surface of the cover layer and perpendicular to the conveying direction, and carrying a DC current (see also FIG. 4). As described further above, the electromagnetic field, which alternates in the conveying direction, heats by induction a susceptor additive or element and therewith the joining material, or it heats the joining material directly. If, as shown in FIG. 1, in the preheating zone PH the cover layer 2 and the object 1 and possibly a susceptor or absorber element 4 are arranged in contact with each other, the named electric conductor 7 or any other preheating device 6 suitable for heating the joining material by electromagnetic induction, in particular an induction heater is arranged to face the outer side of the cover layer 2, wherein, depending on the position of the joining material, an outer portion of the cover layer 2 or the whole cover layer is to be transparent for the electromagnetic field.

Immediately downstream of the preheating zone PH follows the liquefaction zone L, in which mechanical vibration, in particular ultrasonic vibration US, and a pressing force PF are applied by a vibrating tool 8 to the arrangement of cover layer 2 and object 3, which arrangement includes the preheated joining material. The vibrating tool 8 is arranged to act on the outer surface of the cover layer 2 and is, e.g., a longitudinally vibrating sonotrode. Depending on the position of the joining material, an outer portion of the cover layer 2 or the whole cover layer needs to be able to transmit the vibration, preferably with as little energy loss as possible. For effective transmission of the vibration, the objects need to be rigid enough and the conveying means correspondingly equipped, such that the objects 1 can function as anvil counteracting the vibration and the pressing force. For processing a non-rigid object, the liquefaction zone L is to be further equipped with an anvil element.

The preheating device and the vibrating tool are to be arranged along the conveying direction such that each cover layer region arriving at the vibrating tool still has a temperature which is not below the glass transition temperature of the polymer base of the joining material.

Immediately downstream of the liquefaction zone L follows a consolidation zone C, in which the arrangement of cover layer 2 and object 1 and possibly susceptor or absorber element 4 is kept pressed together for a time sufficient for the liquefied or plasticized joining material to re-solidify. A corresponding consolidation device 10 is, e.g., an arrangement of a plurality of spring-loaded rollers around which a belt rotates, the arrangement being actively or passively driven for the belt to move with the same speed (conveying speed) as the objects 1.

From the consolidation zone C, the arrangement of objects 1 and cover layer 2 reach the delivery zone D in which any further handling may be carried out. In particular, the cover layer 2 may be separated between each pair of successive objects 1, for which purpose a suitable cutting device (not shown) is arranged in the delivery zone D.

It may be advantageous to further equip the installation with a shielding device 15, which is, e.g., realized as an actively or passively rotating shielding belt 16 (only partly indicated with a dash-dotted line) arranged to come into contact with the outer surface of the cover layer 2 upstream of the liquefaction zone L and to be removed from the latter downstream of the consolidation zone C. Such a shielding belt 16 may have two functions: firstly, to shield the sonotrode 9 from the electromagnetic or other effect of the preheating device 6, and secondly, for preventing marking of the outer surface of the cover layer 2 by the vibrating tool 8 and/or the consolidation device 10. The shielding belt 16 consists, e.g., of a thin metal foil. Alternatively, the two named functions of the shielding device 15 may be taken over by two separate elements, e.g. a stationary shield for shielding the sonotrode 9 and a belt-like element for protecting the outer surface of the cover layer 2.

Figure 2:
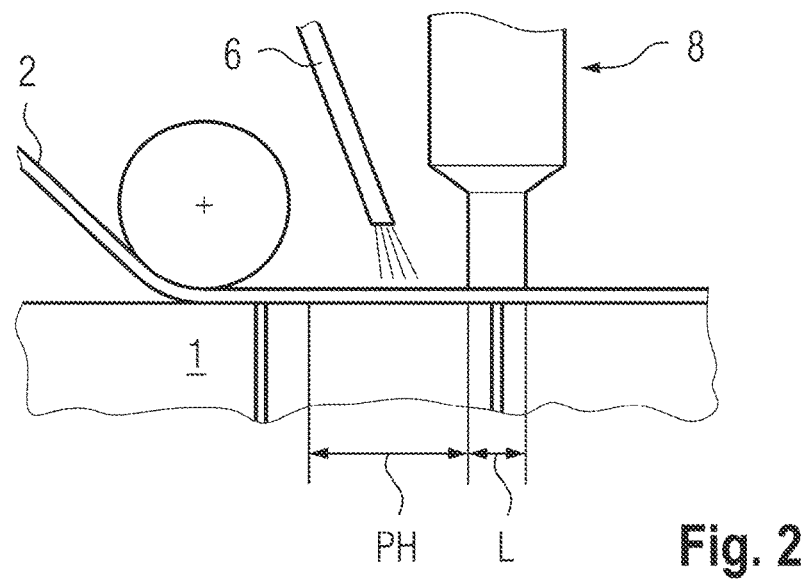
FIG. 2 shows an example of pre-heating devices suitable for installation and method being state of the art.

FIG. 2 is a detail of an installation being state of the art. Therein the preheating device 6 is a source of electromagnetic radiation, e.g. a laser generating electromagnetic radiation e.g. in the visible or infrared frequency range, or a source of hot air. The radiation or hot air is directed towards the outer side of the cover layer 2, which, as above described in connection with FIG. 1, is positioned in contact with the object 1. Depending on the position of the joining material, an outer portion of the cover layer 2 or the whole cover layer 2 is to be transparent for the electromagnetic radiation.

Figure 3:
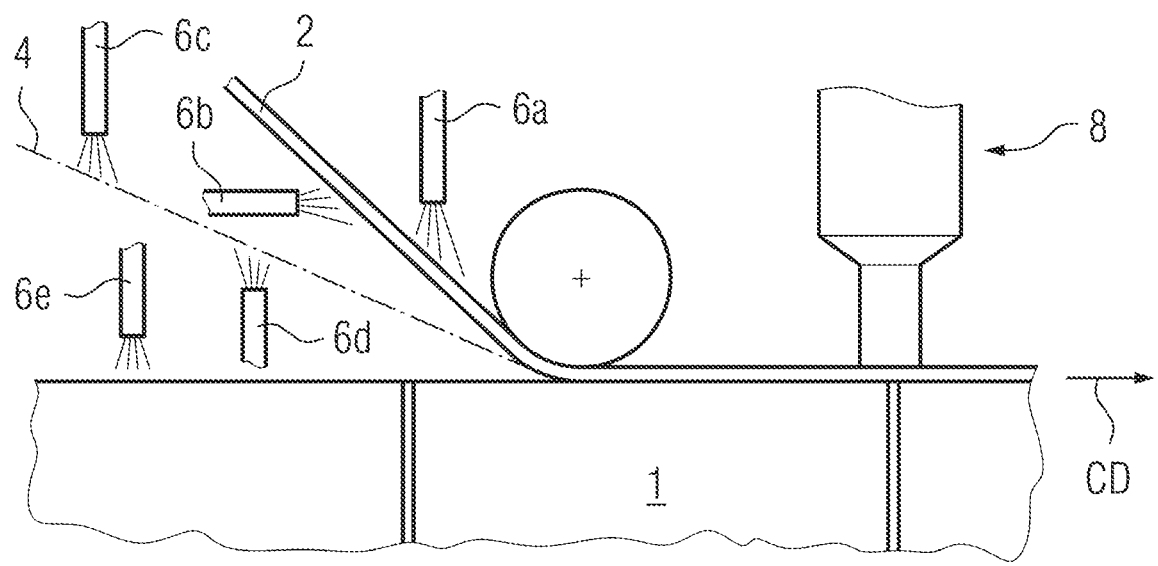
FIG. 3 shows exemplarily possible positions in an installation according to the invention of pre-heating devices.

FIG. 3 is again a detail of an installation similar to the installation of FIG. 1 and illustrates a plurality of alternative positions for the preheating device 6. Other than illustrated in FIG. 1, preheating according to FIG. 3 is effected when the cover layer 2 and the object 1 and possibly a separate susceptor or absorber element 4 are arranged facing each other but are not yet positioned in contact with each other. Depending on the location of the joining material it is either the cover layer 2, the separate susceptor or absorber element 4 or the object 1 which is subjected to the preheating. For heating joining material arranged on the inner surface of the cover layer 2, the latter is heated from the outer side (position of preheating device 6a) or from the inner side (position of preheating device 6b). For preheating joining material arranged on the cover layer 2 or on the object 1 with the aid of a separate susceptor or absorber element 4, the latter is heated from either one of its sides (positions of the preheating device 6c and 6d). Joining material arranged on the object is preheated by heating the object 1 (position of the preheating device 6d).

Figure 5:
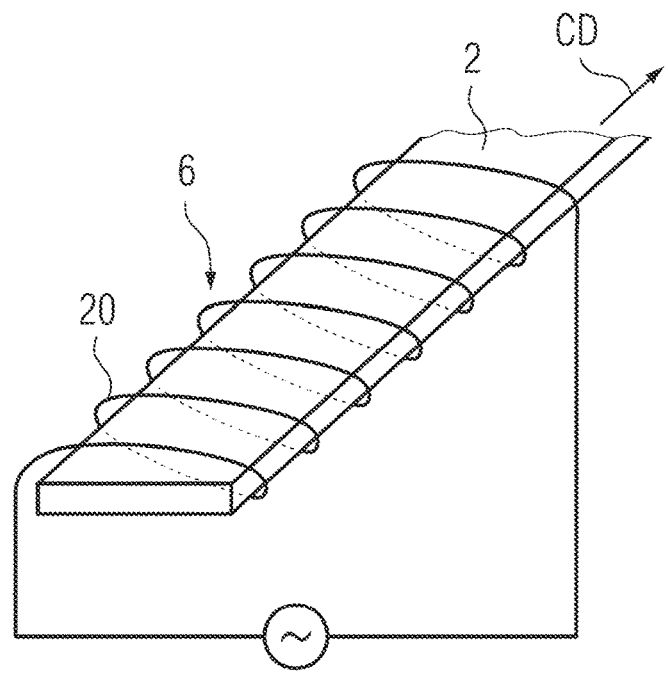
FIG. 5 shows an example of pre-heating devices suitable for installation and method according to the invention.

FIGS. 4 and 5 illustrate two exemplary preheating devices 6 for preheating by electromagnetic induction.

FIG. 4 is a top view of the cover layer 2 and further shows a preheating device 6 as already illustrated and briefly described in connection with FIG. 1. The preheating device 6 includes an electric conductor 7 extending back and forth over the width of the cover layer 2 as close as possible to the outer surface of the latter. The electric conductor 7 is connected to a source of direct current. For optimal efficiency of the preheating, the distances between the parallel conductor pieces and the conveying speed are to be adapted to the electromagnetic characteristics of the susceptor used.

FIG. 5 is a schematic three-dimensional illustration of a further example of a preheating device 6, being constituted by a conductor spiral 20 through which e.g. the cover layer 2 or possibly the separate susceptor or absorber element is conveyed. The conductor spiral 20 is connected to a source of an alternating current.

FIGS. 6 to 10 illustrate examples of vibrating tools 8 suitable for an installation as illustrated by FIG. 1.

Figure 6:
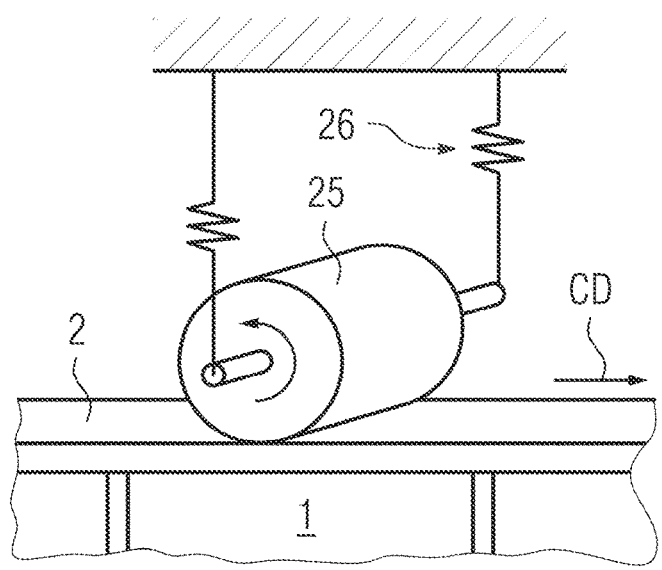
FIG. 6 shows an example of vibrating tools suitable for installation and method according to the invention.

FIG. 6 shows a rotating sonotrode 25 as vibrating tool 8. The axis of the rotating sonotrode 25 is arranged perpendicular to the conveying direction CD and parallel to the width of the cover layer 2. The sonotrode 25 is rotated such that its circumferential speed is substantially the same as the conveying speed. The pressing force necessary for the liquefaction step is realized e.g. by a resilient anchorage 26 of the sonotrode 25.

Figure 7:
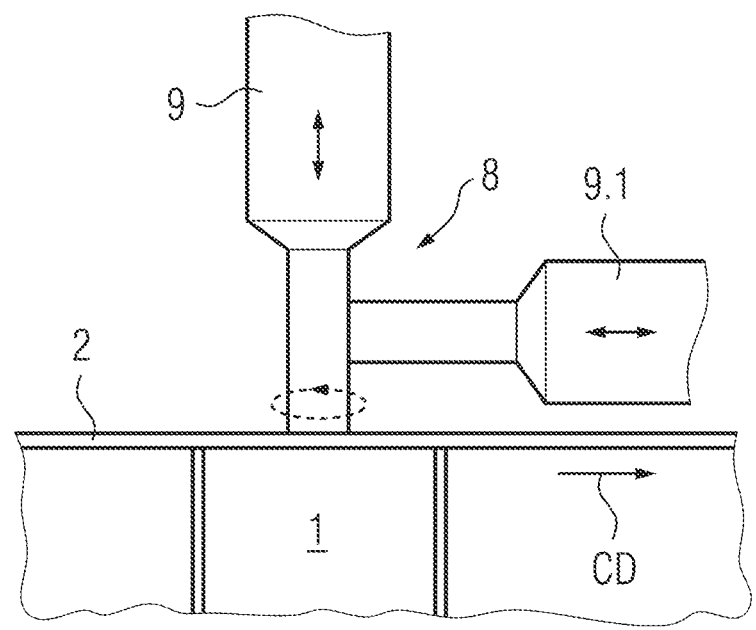
FIG. 7 shows an example of vibrating tools suitable for installation and method according to the invention.

FIG. 7 shows a vibrating tool 8 in the form of a stationary sonotrode 9, e.g., of the same kind as shown in FIG. 1, which is further excited by a second stationary sonotrode 9.1 acting laterally on the distal end of the sonotrode 9 to superimpose on the longitudinal vibration of the sonotrode 9 a vibration parallel to the conveying direction. With corresponding adaptation of the two vibrations their superposition results in an oval shaped movement of the distal face of the sonotrode 9, as indicated by the oval dashed arrow at the distal end of sonotrode 9, whose part directed in the conveying direction coincides with the elongation of sonotrode 9 and whose part in the opposite direction coincides with the contraction or sonotrode 9.

Figure 8:
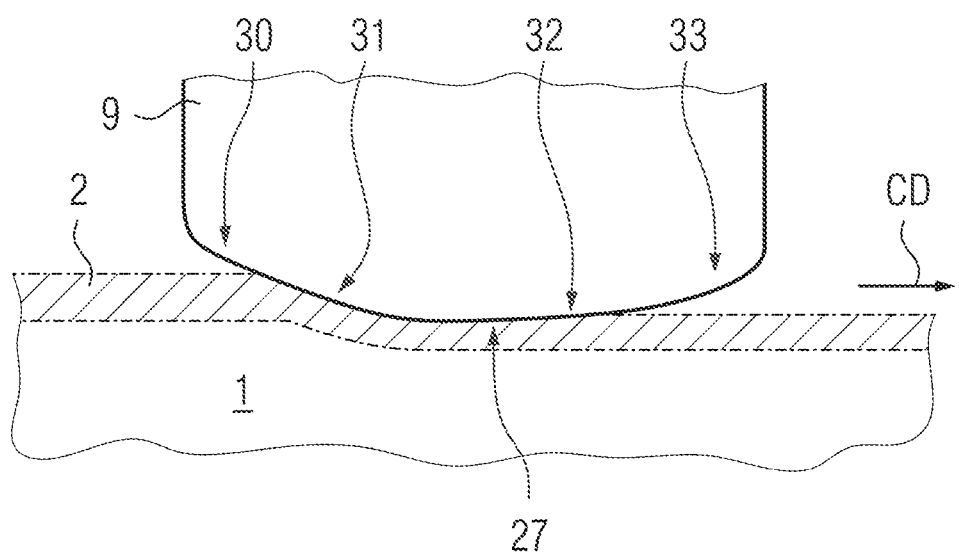
FIG. 8 shows an example of vibrating tools suitable for installation and method according to the invention.

FIG. 8 shows a detail of a further example of a stationary sonotrode 9 of which only the profile of its distal face 28 is shown. This profile includes in the conveying direction an entry portion 30 with a rounded edge, a pressing and advancement portion 31, in which the sonotrode length continuously increases, a pressing portion 32, in which the sonotrode length remains constant, and an exit portion 33 in which the sonotrode length decreases. The arrangement of cover layer 2 and object 1 (indicated in dash-dotted lines) is conveyed past the distal face 27 of the sonotrode 9, arrangement and sonotrode being biased against each other. When passing the entry portion 30, the vibration starts acting on the cover layer 2. During conveyance through the pressing and advancement portion 31, the sonotrode presses the arrangement further together such compensating loss of volume between the cover layer 2 and the object 1 due to displacement of liquefied joining material. During conveyance past the pressing portion 32, pressing force and vibration act without change on the arrangement of cover layer 2 and object 1 for finalizing liquefaction and displacement of the joining material, and, during conveyance past the exit portion 33, the effect of pressing force and vibration becomes weaker and stops.

Figure 9:
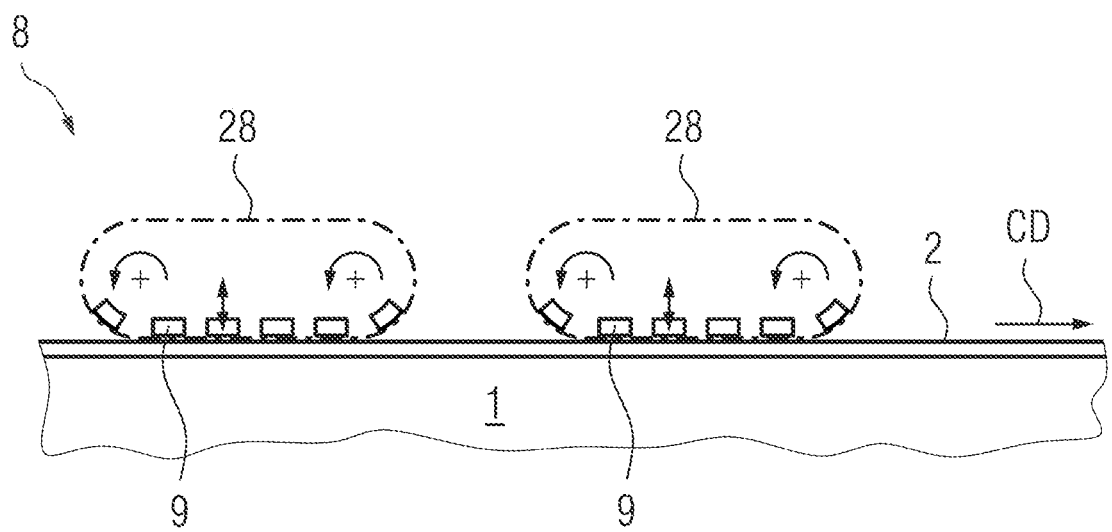
FIG. 9 shows an example of vibrating tools suitable for installation and method according to the invention.

FIG. 9 shows, as a further example of a vibrating tool 8 suitable for method and installation according to the invention, an arrangement of a plurality of sonotrodes 9, which are arranged on a rotating band 28 such that for a part of their conveying path they are arranged for acting on the cover layer 2 while moving in the conveying direction CD with the same speed as the cover layer 2. Therefore, there is no relative movement in conveying direction between the sonotrodes 9 and the cover layer 2. Untreated regions of the cover layer resulting from gaps between the sonotrodes 9 are preferably treated with the aid of a further, similar sonotrode arrangement, which is arranged further downstream. If necessary, a further pre-heating device (not shown) may be arranged between the two sonotrode arrangements.

Figure 10:
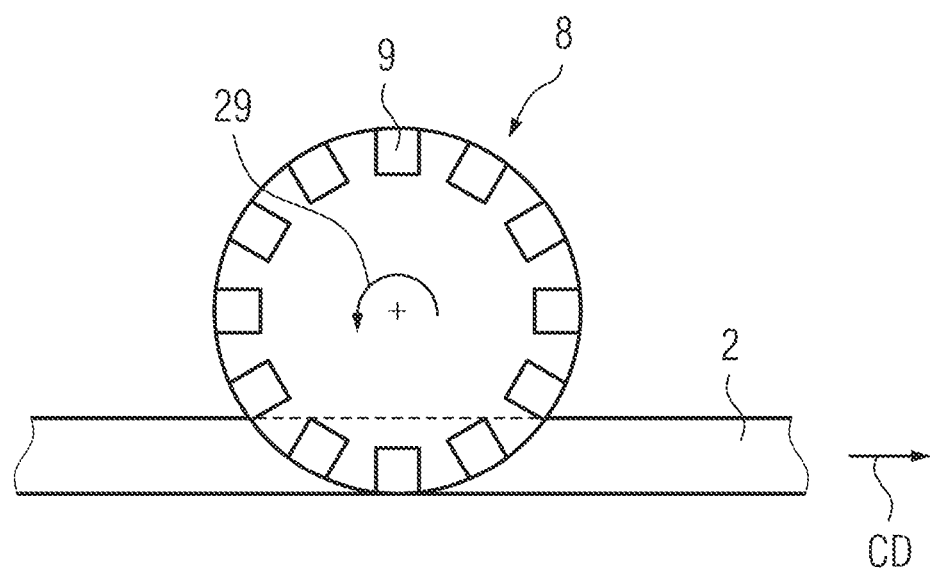
FIG. 10 shows an example of vibrating tools suitable for installation and method according to the invention.

FIG. 10 is a top view of a further example of a vibrating tool 8 suitable for an installation as illustrated in FIG. 1. The device includes a rotating wheel 29 on which a plurality of sonotrodes 9 are arranged. The rotation axis of the wheel extends perpendicular to the conveying direction CD and perpendicular to the width of the cover layer 2 and is positioned to one side of the arrangement of cover layer 2 and object, such that of the circular path of the sonotrodes 9, the one part in which the sonotrodes move substantially in conveying direction CD is arranged such that the faces of the sonotrodes are positioned against the outer surface of the cover layer 2, wherein the speed of the sonotrodes substantially coincides with the conveying speed.

FIGS. 11 to 18 illustrate examples of pairs of cover layer 2 and object 1 that are adapted to each other for being suitable to be joined using method and installation according to the invention. The drawings are sections through cover layer and object wherein the section planes may be oriented in the direction of the cover layer width (perpendicular to the conveying direction) or parallel to the conveying direction. For all the examples, the illustrated joining regions of cover layer and object can be mutually exchanged, i.e., be arranged on object and cover layer, instead of on cover layer and object. Furthermore, most of the examples can be designed such that the joint between the cover layer and the object extends substantially over the whole inner surface of the cover layer or only over specific regions thereof. Such specific regions extend, e.g., substantially parallel to each other in the conveying direction, which is realized by a corresponding arrangement of the joining material and the susceptor or absorber and/or by arranging a plurality of preheating devices and vibrating tools distanced from each other over the width of the cover layer. Furthermore, joint interruptions in conveying direction can be realized also, again by corresponding arrangement of the joining material and the susceptor or absorber and/or by, e.g., regular stop-and-go action of the preheating device and/or the vibrating tool.

Figure 11:
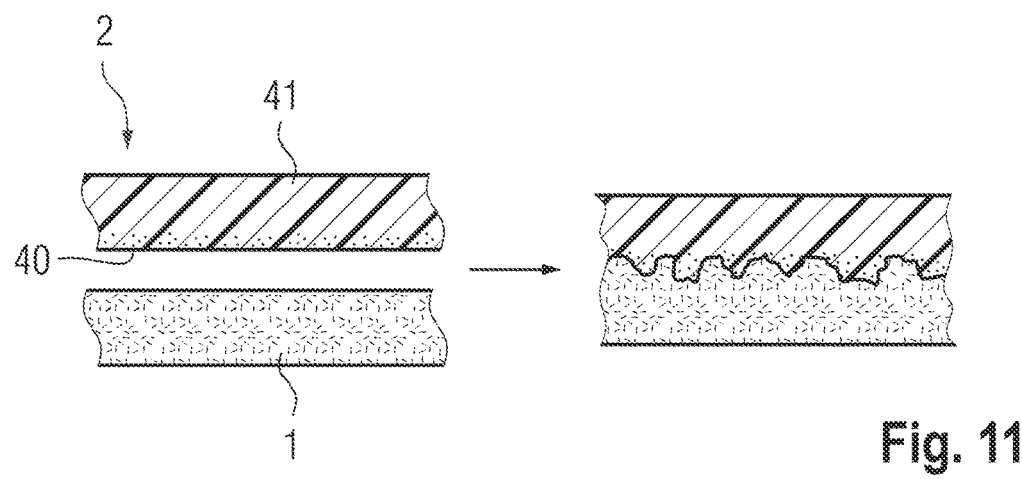
FIG. 11 illustrates an exemplary pair of cover layer and object suitable for being joined with the method according to the invention.

FIG. 11 shows, on the left before the joining process and on the right thereafter, a pair of a cover layer 2 and object 1, wherein the whole inner portion 40 of the cover layer 2 consists of the joining material which includes the susceptor or absorber additive (indicated with dots randomly distributed in the material), and wherein the object 1 (or at least the contact surface thereof) includes a penetrable (e.g. porous or fibrous) material, e.g., chip board or wood. An outer portion 41 of the cover layer 2 may also include a thermoplastic polymer that may be the same as or different from the thermoplastic polymer of the joining material (inner portion 40 of the cover layer) but, by not including the susceptor or absorber additive, is not preheated and therefore not liquefied. For the pair of cover layer 2 and object 1 as shown in FIG. 11, preheating from the inner side (FIG. 3: position 6*b*) of the cover layer is possible for any material of the outer portion 41 of the cover layer; preheating from the outer side of the cover layer 2 (FIGS. 1 and 2 or FIG. 3: position 6*a*) is possible only if the outer portion 41 of the cover layer is correspondingly transparent or respectively conducting. The latter case is illustrated by FIG. 12 showing a cover layer 2 including in addition to the inner portion 40 of the joining material, a metal outer portion 41, which is suitable also as susceptor or as absorber.

Figure 12:
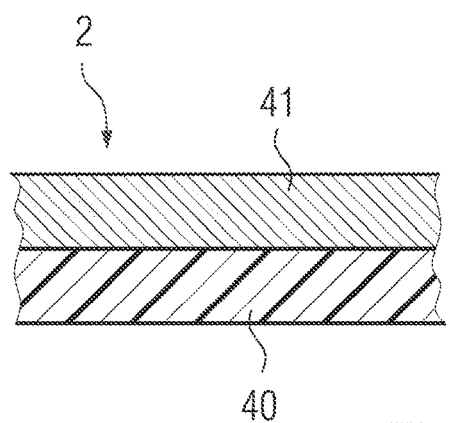
FIG. 12 illustrates an exemplary pair of cover layer and object suitable for being joined with the method according to the invention.

The cover layer 2 according to either one of FIGS. 11 and 12, be it a relatively narrow edge strip or a foil-like item of a larger width, may be fabricated by laminating the inner and the outer portion being separately extruded, by co-extrusion of the two portions, or by contacting the inner surface of the extruded full cover layer with a bed of the susceptor or absorber additive and then pressing the latter into the still soft thermoplastic material of the cover layer.

Figure 13:
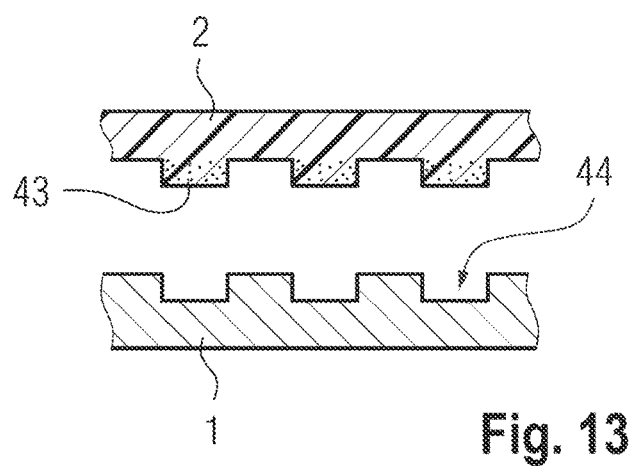
FIG. 13 illustrates an exemplary pair of cover layer and object suitable for being joined with the method according to the invention.

FIG. 13 illustrates a similar joining principle as FIG. 11 but differing therefrom by the joining regions of the cover layer 2 being restricted to longitudinal stripes 43 and the joining regions of the object 1 being constituted by undercut grooves 44, which, during the joining process, are penetrated and filled with the joining material. Of course, the cover layer 2 according to FIG. 13 may also be paired with the object 1 according to FIG. 11 and the stripes 43 of the joining material may be arranged on the object and the cover layer including the grooves 44 or any other suitable penetrable material.

Figure 14:
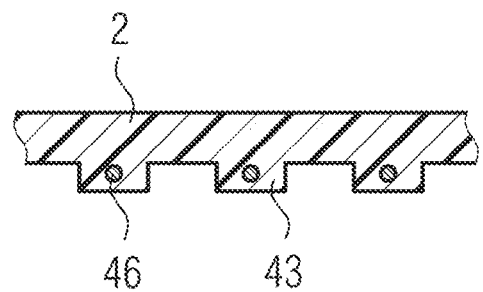
FIG. 14 illustrates an exemplary pair of cover layer and object suitable for being joined with the method according to the invention.

FIG. 14 shows a further example of a cover layer 2 suitable for being, e.g., paired with the objects 1 according to FIG. 11 or 13. The joining material of this cover layer does not include a susceptor or absorber additive that is dispersed in the thermoplastic polymer, but a susceptor or absorber additive in the form of at least one wire 46, thread or band of a woven or non-woven arrangement of susceptor or absorber fibers, threads or wires, extending within each one of the stripes 43. Such a wire, thread or band may further function for maintaining the length of the cover layer in particular for a cover layer on the basis of a thermoplastic polymer, which may be prone to be extended in conveying direction when preheated and under the strain of the conveyance.

Figure 15:
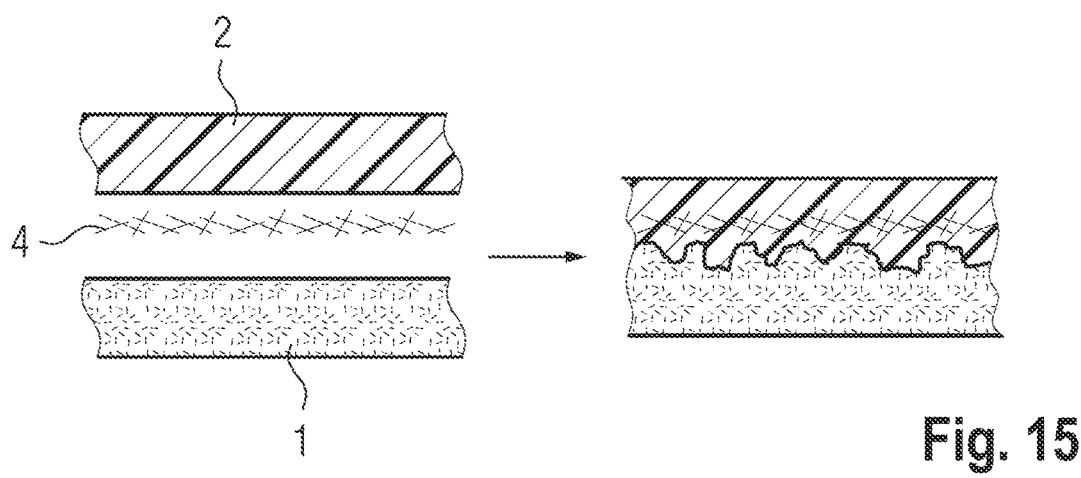
FIG. 15 illustrates an exemplary pair of cover layer and object suitable for being joined with the method according to the invention.

FIG. 15 shows, on the left before the joining process and on the right thereafter, an example of a pair of cover layer 2 including the joining material, and object 1 of a penetrable material, wherein the pair further includes a separate susceptor or absorber element 4 being constituted by, e.g., a woven or non-woven arrangement of susceptor or absorber fibers, threads or wires. The susceptor or absorber element 4, which may have a same width as or a smaller width than the cover layer or may include a plurality of longitudinal bands arranged at a distance from each other or without such distance, is fed into the continuous joining process separately, is positioned between cover layer 2 and object 1 and is preferably preheated before the three are brought into contact with each other (FIG. 3: preheating positions 6c and 6d). Through the action of the vibration energy, the liquefied joining material is being dislocated through the susceptor or absorber element 4 and into the penetrable material of the object.

A separate susceptor or absorber element 4 may also be suitable for production of a sandwich-structured composite. The final sandwich-structured composite may be composed of cover layer 2 susceptor or absorber element 4 and object 1, wherein cover layer 2 and object 1 may consist of the same material and have the function of the top layer within the sandwich structure and the susceptor or absorber element 4 may constitute the core within the sandwich structure. An alternative method according to the invention to produce a sandwich-structured composite may include to join two cover layers 2 (representing top layers) with an object 1 (representing the core) either sequentially or parallel. A method for joining the two cover layers 2 (representing top layers) with an object 1 (representing the core) within one process (in parallel) includes providing two cover layers 2 and one object 1, the two cover layers 2 and each including a contact surface and the object 1 includes two contact surfaces, one contact surface of the object 1 and the contact surface of one cover layer 2 facing each other in a joint to be established, and the joining material being arranged to constitute at least part of one of the two contact surfaces of each joint, arranging the two cover layers 2 and the object 1 with the contact surface of each cover layer 2 and the contact surfaces of the object 1 facing each other, bringing the contact surface of the two cover layers 2 in contact with the contact surfaces of the object 1, preheating the joining material in a contactless manner for a time sufficient for raising the temperature of the joining material to above its glass transition temperature, pressing the two cover layers 2 against the object 1 and applying mechanical vibration energy to an outer surface of at least one cover layer 2 for a time sufficient for liquefaction or at least plastification and possibly dislocation of the joining material, the step of pressing and applying mechanical vibration energy being carried out after the step of preheating, consolidating the liquefied or plasticized and possibly dislocated joining material by stopping application of the mechanical vibration energy and still pressing the two cover layers 2 against the object 1 for a time sufficient for the joining material to re-solidify, and conveying the two cover layers 2 and object 1 in a continuous manner in a conveying direction (CD) throughout the steps of arranging, of bringing into contact, of subjecting to preheating, of pressing and applying vibration energy, and of consolidating, wherein the method further includes a step of providing a susceptor or absorber being one of integrated in the joining material, being arranged or arrangeable in the vicinity of the joining material, being the core material, and being constituted by the thermoplastic polymer base of the joining material, and wherein the step of preheating includes exciting the susceptor or absorber with electromagnetic energy and heating the joining material by electric or magnetic induction.

Figure 16:
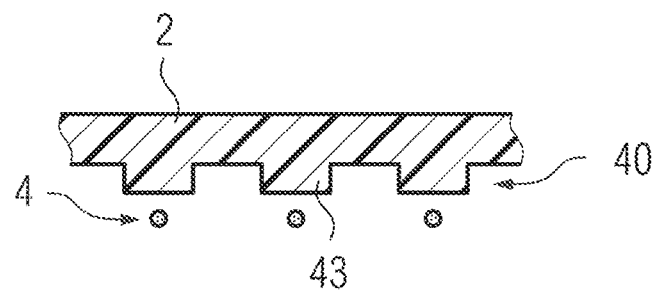
FIG. 16 illustrates an exemplary pair of cover layer and object suitable for being joined with the method according to the invention.

FIG. 16 shows an example of a cover layer 2 and a suitable separate susceptor or absorber element 4, the two being suitable for being joined to an object including a penetrable material such as, e.g., shown in FIG. 11 or 13.

The inner portion 40 of the cover layer includes stripes 43 of the thermoplastic polymer base of the joining material. The susceptor or absorber element 4 is constituted by at least one wire 46 or thread of a suitable material and extending parallel to each one of the stripes. The joining process is the same as above described in connection with FIG. 15.

Figure 17:
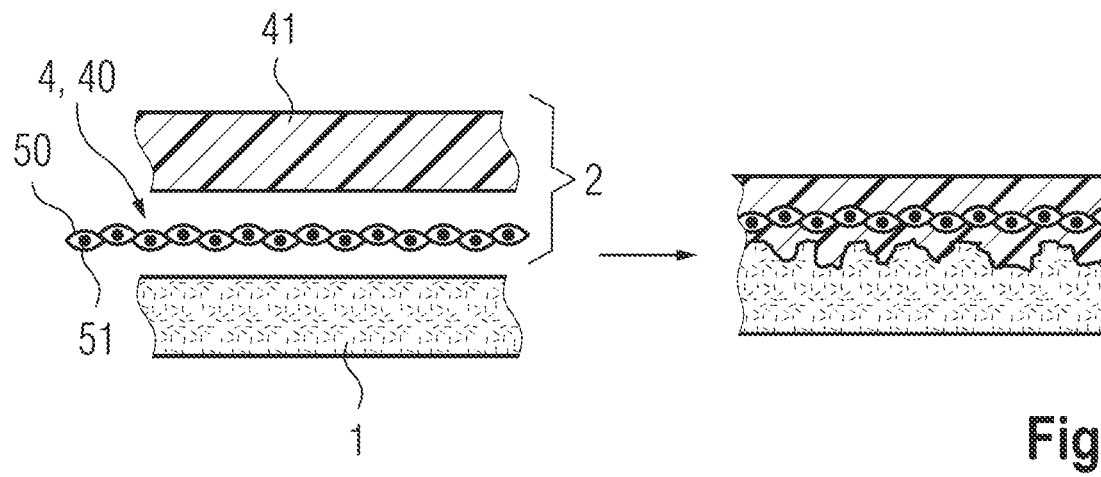
FIG. 17 illustrates an exemplary pair of cover layer and object suitable for being joined with the method according to the invention.

FIG. 17 shows, on the left before the joining process and on the right thereafter, a further example of a pair of cover layer 2 and object 1 including a penetrable material, wherein the pair further includes a separate susceptor or absorber element 4. This susceptor or absorber element 4 includes not only the susceptor or absorber but also at least part of the thermoplastic polymer base of the joining material (inner portion 40 of cover layer 2). The element 4 is, e.g., a woven band in which the susceptor or absorber material constitutes the warp 50 (e.g., metal wire, extending in the conveying direction) and the thermoplastic polymer constitutes the weft 51 (e.g., thermoplastic filament, extending perpendicular to the conveying direction). The joining process is substantially the same as above described for cover layer, object and susceptor or absorber element according to FIG. 15, wherein however in the same process the outer portion 41 of the cover layer 2, if including a suitable material, is welded (or otherwise joined) to the inner portion 40 and wherein possibly part of this outer portion 41 may be sufficiently preheated for being liquefied and displaced into the permeable material of the object 1, i.e., for functioning as part of the joining material.

If, in the set-up of FIG. 17, the object 1, at least in the joining regions, includes not a penetrable material but a thermoplastic or thermoset polymer the thermoplastic polymer comprised in the susceptor or absorber element 4 may be welded or adhesively joined simultaneously to both the object and the outer portion 41 of the cover layer 2.

Figure 18:
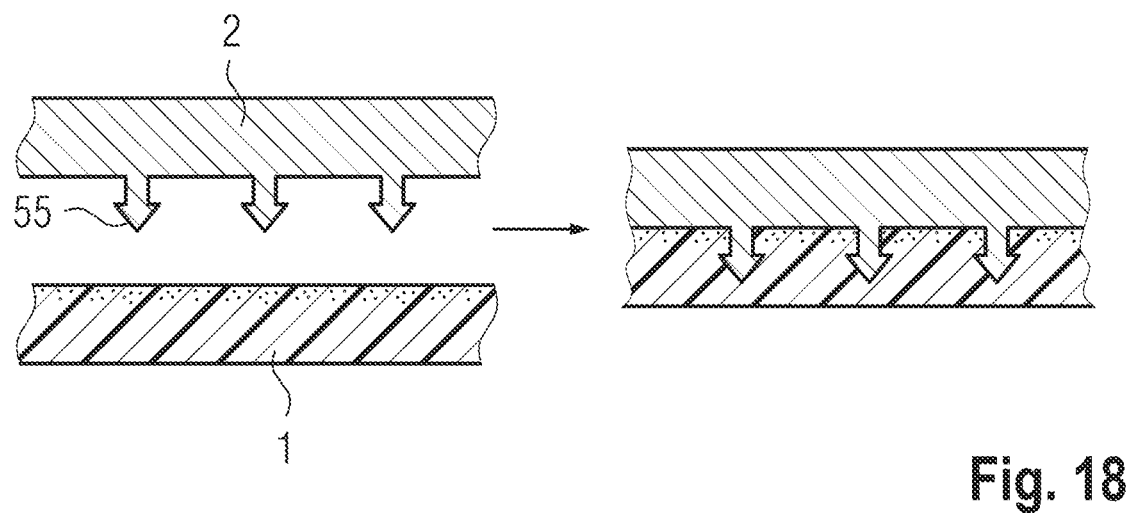
FIG. 18 illustrates an exemplary pair of cover layer and object suitable for being joined with the method according to the invention.

FIG. 18 shows, on the left before the joining process and on the right thereafter, a pair of cover layer 2 and object 1, wherein the object 1 includes the joining material (e.g., thermoplastic polymer with susceptor or absorber additive dispersed therein) and wherein the cover layer 2 is made of a material that is not liquefiable under the process conditions and includes protrusions 55 (preferably undercut or having a rough surface), e.g., undercut tapering tips or undercut tapering ridges, which, during the joining process, are embedded in the liquefied or at least plasticized joining material. In the set-up of FIG. 18 other susceptors or absorbers are applicable, such as e.g. the separate susceptor or absorber elements as discussed in connection with FIGS. 14 to 17.

Figure 19:
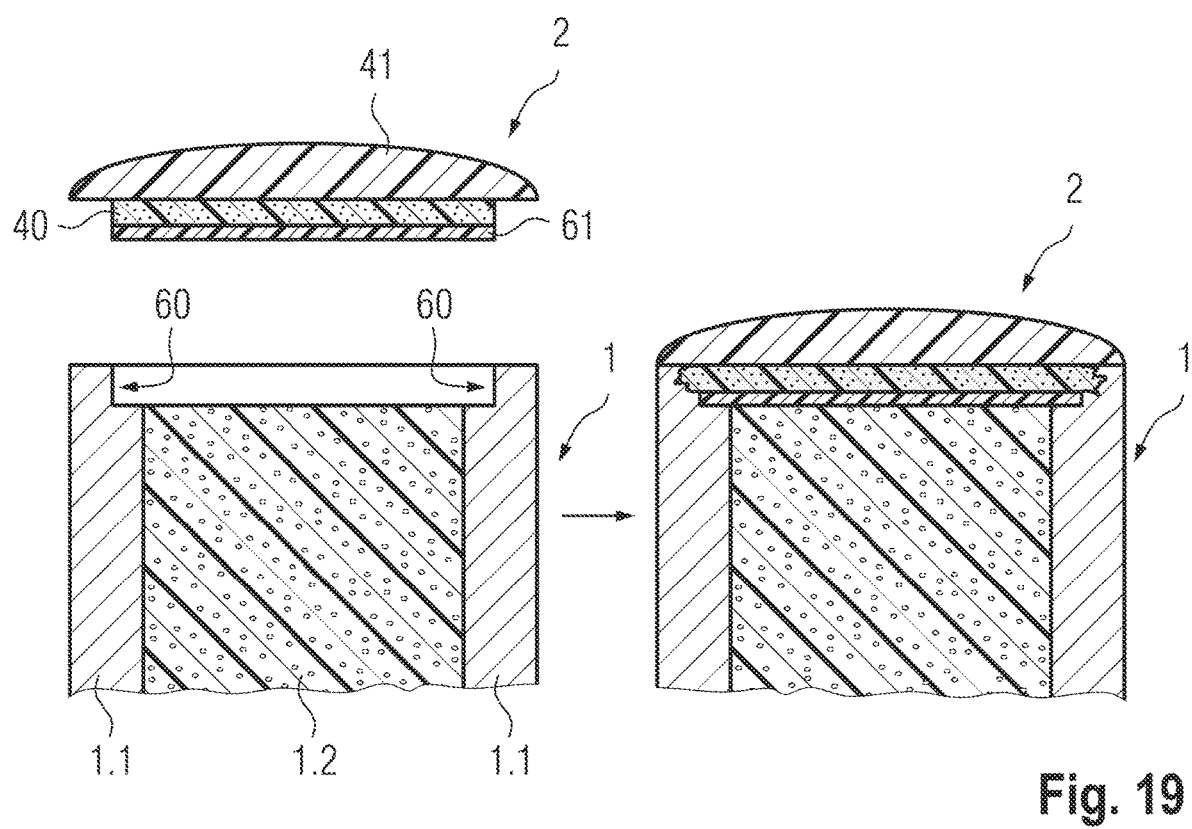
FIG. 19 illustrates as a specific exemplary application of the method according to the invention the fixation of an edge strip to the edge of a hollow core board.

FIG. 19 shows, on the left before the joining process and on the right thereafter, a further example of a pair of object 1 and cover layer 2. The object 1 is a so called hollow core board including two surface layers 1.1 of, e.g., wood, plywood, chipboard or of a material including a thermoplastic or thermoset polymer, and a lightweight core 1.2, e.g., of a foam material or of a cardboard honey comb structure. The cover layer 2 is an edge strip designed for being joined to the edge of the hollow core board. As only the surface layers 1.1 of the board have a sufficient mechanical stability for joining the edge strip, the joining regions are situated at the lateral edges of the edge strip and at the edges of the surface layers 1.1, which for the purpose are preferably tapering in a step 60 or continuously away from the core layer 1.2. The edge strip includes three superimposed portions, an outer portion 41 and an inner portion 40 as described further above in connection with, e.g., FIGS. 10 and 11, wherein the inner portion 40 includes the joining material. Furthermore, the edge strip includes an innermost portion 61 which has a width such that it can be supported by the two steps 60 and which has enough mechanical stability to serve as anvil and to protect the core layer 1.2 from being exposed to mechanical stress. In the joining process, the joining material of the inner strip portion 40 is liquefied or at least plasticized and is pressed out laterally, where it comes into contact with the surface layers 1.1 of the hollow core board and, depending on the material of the surface layers 1.1, penetrates this material or forms a weld or an adhesive connection therewith.

The advantage of the edge strip fixation to an edge of a hollow core board according to FIG. 19 consists primarily in the fact that such fixation can be accomplished with little lateral force being applied to the surface layers 1.1 of the board and no force is applied to its core layer 1.2. The edge strip is, e.g., fully made of a thermoplastic material (e.g. PEEK) which, when preheated above its glass transition temperature can easily be liquefied by vibration energy, but which, without pre-heating due to absence of susceptor or absorber, is hardly liquefiable by vibration energy and therefore keeps a stiffness suitable for the innermost portion 61 throughout the joining process. The edge strip according to FIG. 19 is preferably fabricated by co-extrusion.

What is claimed is:

1. A method for joining a cover layer to an object in a continuous joining process using mechanical vibration energy and a joining material based on a thermoplastic polymer being liquefied or at least plasticized with the aid of the mechanical vibration energy, the method comprising the steps of:
    providing the cover layer and the object, the cover layer and the object each comprising a contact surface, the two contact surfaces facing each other in a joint to be established, and the joining material being arranged to constitute at least part of one of the two contact surfaces,
    arranging the cover layer and the object with the contact surface of the cover layer and the contact surface of the object facing each other,
    bringing the contact surface of the cover layer in contact with the contact surface of the object,
    preheating the joining material in a contactless manner for a time sufficient for raising the temperature of the joining material to above its glass transition temperature,
    pressing the cover layer against the object and applying mechanical vibration energy to an outer surface of the cover layer for a time sufficient for liquefaction or at least plastification and possibly dislocation of the joining material, the step of pressing and applying mechanical vibration energy being carried out after the step of preheating,
    consolidating the liquefied or plasticized and possibly dislocated joining material by stopping application of the mechanical vibration energy and still pressing the cover layer against the object for a time sufficient for the joining material to re-solidify, and
    conveying the cover layer and object in a continuous manner in a conveying direction throughout the steps of arranging, of bringing into contact, of subjecting to preheating, of pressing and applying vibration energy, and of consolidating, wherein the method further comprises a step of providing a susceptor or absorber being one of integrated in the joining material, being arranged or arrangeable in the vicinity of the joining material, and being constituted by the thermoplastic polymer base of the joining material, and wherein the step of preheating comprises exciting the susceptor or absorber with electromagnetic energy and heating the joining material by electric or magnetic induction.

2. The method according to claim 1, wherein the step of pressing and applying mechanical vibration energy is carried out before the temperature of the preheated joining material drops below the glass transition temperature of the joining material.

3. The method according to claim 1, wherein the step of preheating is carried out after or before the step of bringing into contact.

4. The method according to claim 1, wherein the susceptor or absorber is integrated in the joining material and consists of particles or fibers dispersed in the joining material or of a two- or three-dimensional structure of fibers, threads or wires.

5. The method according to claim 1, wherein the susceptor or absorber is arranged adjacent to the joining material and is constituted by a further material of the cover layer or the object.

6. The method according to claim 1, wherein the susceptor or absorber is a separate susceptor or absorber element, which, in the step of arranging is arranged between the contact surfaces of the cover layer and the object.

7. The method according to claim 1, wherein the joining material constitutes the whole contact surface of the cover layer or of the object and the susceptor or absorber is arranged evenly over the whole of said contact surface of the cover layer or the object.

8. The method according to claim 1, wherein the joining material constitutes part of the contact surface of the cover layer or the object and wherein the susceptor or absorber is arranged on said part of the contact surface of the cover layer or the object.

9. The method according to claim 8, wherein said part of the contact surface of the cover layer or the object is a plurality of stripes extending parallel to the conveying direction.

10. The method according to claim 1, wherein at least a part of the contact surface of the object or of the cover layer, which part faces the joining material, comprises a penetrable material to be penetrated by the joining material.

11. The method according to claim 1, wherein at least a part of the contact surface of the object or of the cover layer, which part faces the joining material, comprises protrusions to be embedded in the joining material.

12. The method according to claim 1, wherein at least a part of the contact surface of the object or of the cover layer, which part faces the joining material, comprises a further thermoplastic polymer being weldable to the joining material, or a thermoplastic or thermoset polymer capable of forming an adhesive connection with the joining material.

13. The method according to claim 1, wherein the cover layer is flexible enough to be provided from a feed roller.

14. The method according to claim 1, wherein the object is one of a large number of objects which are conveyed in succession.

15. The method according to claim 1, wherein the cover layer is an edge strip and the object is a board and wherein the edge strip is joined to one edge of the board.

16. The method according to claim 15, wherein the board comprises chip board or is a hollow core board.

17. An installation for carrying out the method as defined in claim 1, the installation comprising:
    a feeding zone equipped for arranging the cover layer and the object with the contact surface of the cover layer and the contact surface of the object facing each other, and for bringing the contact surface of the cover layer in contact with the contact surface or the object, a preheating zone arranged downstream or partially overlapping the feeding zone and being equipped with a preheating device, a liquefaction zone arranged downstream of the preheating zone and being equipped with a vibrating tool arranged for applying mechanical vibration and a pressing force to an outer surface of the cover layer, a consolidation zone equipped with a consolidation device arranged for further application of a pressing force to the outer surface of the cover layer, and a conveyor for conveying the object in a continuous manner in a conveying direction through the feeding zone, the preheating zone, the liquefaction zone and the consolidation zone to a delivery zone, as well as a further conveying means for feeding the cover layer into and through the feeding zone, wherein the preheating device is an electric conductor or induction heater arranged for generating an alternating electromagnetic field.

18. The installation according to claim 17, wherein the vibration tool is a stationary sonotrode, a rotating sonotrode or a rotating arrangement of a plurality of sonotrodes.

19. The installation according to claim 17, and further comprising a shielding device, arranged in at least one of the liquefaction zone and the consolidation zone and being equipped for shielding the vibrating tool from an effect of the preheating device and/or for protecting the outer surface of the cover layer.

20. The installation according to claim 17, wherein the conveyor is equipped for conveying in succession a large number of the objects which are boards.

21. The installation according to claim 20, wherein the conveying means is further equipped for feeding an edge strip into the feeding zone and wherein the conveyor is equipped for conveying the boards with one edge facing the edge strip.

22. An installation and a pair of cover layer and object suitable for being joined with the method according to claim 1 in said installation, said installation comprising:

a feeding zone equipped for arranging the cover layer and the object with the contact surface of the cover layer and the contact surface of the object facing each other, and for bringing the contact surface of the cover layer in contact with the contact surface or the object, a preheating zone arranged downstream or partially overlapping the feeding zone and being equipped with a preheating device, a liquefaction zone arranged downstream of the preheating zone and being equipped with a vibrating tool arranged for applying mechanical vibration and a pressing force to an outer surface of the cover layer, a consolidation zone equipped with a consolidation device arranged for further application of a pressing force to the outer surface of the cover layer, and a conveyor for conveying the object in a continuous manner in a conveying direction through the feeding zone, the preheating zone, the liquefaction zone and the consolidation zone to a delivery zone, as well as a further conveying means for feeding the cover layer into and through the feeding zone, wherein the preheating device is an electric conductor or induction heater arranged for generating an alternating electromagnetic field, wherein the cover layer and the object each comprise a contact surface, the two contact surfaces facing each other in a joint to be established, wherein a joining material based on a thermoplastic polymer is arranged to constitute at least part of one of the two contact surfaces, wherein the pair further comprises a susceptor or absorber being one of integrated in the joining material, being arranged or arrangeable in the vicinity of the joining material, or being constituted by the thermoplastic polymer base of the joining material, and wherein the susceptor or absorber can be excited with electromagnetic energy and allows that the joining material is heated by electric or magnetic induction.

23. The pair according to claim 22, wherein another one of the two contact surfaces of the cover layer or of the object, which other one of the two contact surfaces does not comprise the joining material, comprises at least one of a penetrable material, protrusions, a thermoplastic polymer being weldable to the joining material, and a thermoplastic or thermoset polymer being able to form an adhesive connection with the joining material.

24. The pair according to claim 22, wherein the susceptor or absorber is integrated in the joining material and comprises particles or fibers dispersed in the joining material or is a two- or three-dimensional structure of fibers, threads or wires.

25. The pair according to claim 24, wherein the joining material with the integrated susceptor or absorber constitutes an inner portion of the cover layer, and wherein an outer portion of the cover layer comprises a material based on the same thermoplastic polymer as the joining material.

26. The pair according to claim 22, wherein the susceptor or absorber is constituted by a further material of the cover layer or of the object, which further material is arranged in the vicinity of the joining material.

27. The pair according to claim 26, wherein the joining material constitutes an inner portion of the cover layer and wherein an outer portion of the cover layer constitutes the susceptor or absorber.

28. The pair according to claim 22, wherein the susceptor or absorber is constituted by a separate susceptor or absorber element to be positioned between the two contact faces.

29. The pair according to claim 28, wherein the susceptor or absorber element is a woven or non-woven structure of fibers, threads or wires.

30. The pair according to claim 29, wherein the susceptor or absorber element is a woven structure in which the warp constitutes the susceptor or absorber and the weft comprises the joining material.

31. The pair according to claim 22, wherein the cover layer is an edge strip and the object is a board, the edge strip being suitable for being joined to an edge of the board.

32. The pair according to claim 31, wherein the edge strip comprises the joining material and wherein the board is a chip board.

* * * * *